(12) United States Patent
Ahmadi et al.

(10) Patent No.: US 10,585,331 B2
(45) Date of Patent: Mar. 10, 2020

(54) THICK LAYER FOR LIQUID CRYSTAL ON SILICON ASSEMBLY

(71) Applicant: Lumentum Operations LLC, Milpitas, CA (US)

(72) Inventors: Roozbeh Ahmadi, Ottawa (CA); Wenlin Jin, Nepean, CA (US)

(73) Assignee: Lumentum Operations LLC, Milpitas, CA (US)

( * ) Notice: Subject to any disclaimer, the term of this patent is extended or adjusted under 35 U.S.C. 154(b) by 64 days.

(21) Appl. No.: 15/919,979

(22) Filed: Mar. 13, 2018

(65) Prior Publication Data

US 2019/0086762 A1 Mar. 21, 2019

Related U.S. Application Data

(60) Provisional application No. 62/560,929, filed on Sep. 20, 2017.

(51) Int. Cl.
  *G02F 1/13* (2006.01)
  *G02F 1/31* (2006.01)
  *H04Q 11/00* (2006.01)
  *H04J 14/02* (2006.01)

(52) U.S. Cl.
  CPC .......... *G02F 1/31* (2013.01); *H04Q 11/0005* (2013.01); *G02F 2203/05* (2013.01); *H04J 14/0212* (2013.01); *H04Q 2011/0016* (2013.01)

(58) Field of Classification Search
None
See application file for complete search history.

(56) References Cited

U.S. PATENT DOCUMENTS

| 2005/0146003 | A1* | 7/2005 | O'Connor | G02F 1/133308 257/678 |
| 2013/0194651 | A1* | 8/2013 | Srivastava | G02F 1/01 359/279 |
| 2017/0277013 | A1* | 9/2017 | Awaji | G02F 1/31 |
| 2018/0275484 | A1* | 9/2018 | Wada | G02F 1/31 |

* cited by examiner

Primary Examiner — James A Dudek
(74) Attorney, Agent, or Firm — Harrity & Harrity, LLP

(57) ABSTRACT

A liquid crystal on substrate (LCOS) assembly may include an LCOS carrier. The LCOS assembly may include at least one thick layer on the LCOS carrier and associated with a threshold thickness. The threshold thickness may be at least 5 micrometers. The LCOS assembly may include a switching engine on the at least one thick layer. The switching engine may include an LCOS die and an LCOS cover glass to enclose an LCOS liquid. The LCOS assembly may be associated with a thermal sensitivity of less than 0.5 millidegrees of curvature per degree Celsius for a particular temperature range.

20 Claims, 10 Drawing Sheets

THICK LAYER FOR LIQUID CRYSTAL ON SILICON ASSEMBLY

RELATED APPLICATION(S)

This application claims priority under 35 U.S.C. § 119 to U.S. Provisional Patent Application No. 62/560,929, filed on Sep. 20, 2017, the content of which is incorporated by reference herein in its entirety.

TECHNICAL FIELD

The present disclosure relates to liquid crystal on silicon (LCOS) assemblies. More particularly, some aspects of the present disclosure relate to a thick layer for an LCOS assembly that reduces a temperature-induced optical alignment sensitivity (e.g., a reduced change to a beam shift or steering angle for a change in temperature) of the LCOS assembly.

BACKGROUND

A liquid crystal on silicon (LCOS) assembly may be used as a switching element for an optical communication system. For example, a wavelength selective switch (WSS) may include an LCOS to direct wavelength channels of light to different optical ports of the WSS. The LCOS assembly may include multiple components, such as an LCOS mounting post to mount the LCOS assembly in alignment with another optical element of the optical communication system, an LCOS carrier, an LCOS die, an LCOS cover glass, and/or the like.

The LCOS assembly may include components associated with multiple different materials. For example, the LCOS assembly may include an LCOS carrier of a first type of material, such as aluminum nitride and/or the like, associated with a first coefficient of thermal expansion and an LCOS die of a second type of material, such as silicon and/or the like, associated with a second coefficient of thermal expansion that differs from the first coefficient of thermal expansion by a threshold amount.

Similarly, the LCOS cover glass may include a cavity, and the LCOS die may be attached to the LCOS cover glass to enclose LCOS liquid within the cavity of the LCOS cover glass. The LCOS liquid may be associated with a first coefficient of thermal expansion and another component of the LCOS assembly, such as the LCOS cover glass, the LCOS die, the LCOS carrier, the LCOS mounting post, and/or the like may be associated with a second coefficient of thermal expansion that differs from the first coefficient of thermal expansion by a threshold amount. Based on a mismatch between coefficients of thermal expansion and a thermal sensitivity of the LCOS assembly, a change in temperature may cause the LCOS assembly to become misaligned with one or more other optical elements of an optical communication system.

SUMMARY

According to some possible implementations, a liquid crystal on substrate (LCOS) assembly may include an LCOS carrier. The LCOS assembly may include at least one thick layer on the LCOS carrier and associated with a threshold thickness. The threshold thickness may be at least 5 micrometers. The LCOS assembly may include a switching engine on the at least one thick layer. The switching engine may include an LCOS die and an LCOS cover glass to enclose an LCOS liquid. The LCOS assembly may be associated with a thermal sensitivity of less than 0.5 millidegrees of curvature per degree Celsius for a particular temperature range.

According to some possible implementations, an optical switching component may include a substrate associated with a first coefficient of thermal expansion. The optical switching component may include an optical switching engine associated with a second coefficient of thermal expansion that differs from the first coefficient of thermal expansion by a threshold amount. The optical switching component may include at least one thick layer disposed between the substrate and the optical switching engine to reduce a thermal sensitivity of the optical switching component to less than 1 millidegree of curvature per degree Celsius for a particular temperature range.

According to some possible implementations, an optical system may include a switching component to perform optical switching for the optical system. The switching component may include a substrate associated with a first coefficient of thermal expansion. The switching component may include a switching engine associated with a second coefficient of thermal expansion that differs from the first coefficient of thermal expansion by a threshold amount. The switching component may include at least one thick layer disposed between the substrate and the switching engine to reduce a coefficient of thermal expansion mismatch based thermal sensitivity of the switching component to less than 1 millidegree per degree Celsius of curvature for a particular temperature range from a first temperature to a second temperature. The thick layer may deform the switching component by a threshold deformation at the first temperature. The switching component may maintain alignment in an optical path of the optical system for the particular temperature range.

DETAILED DESCRIPTION

Figure 1A:
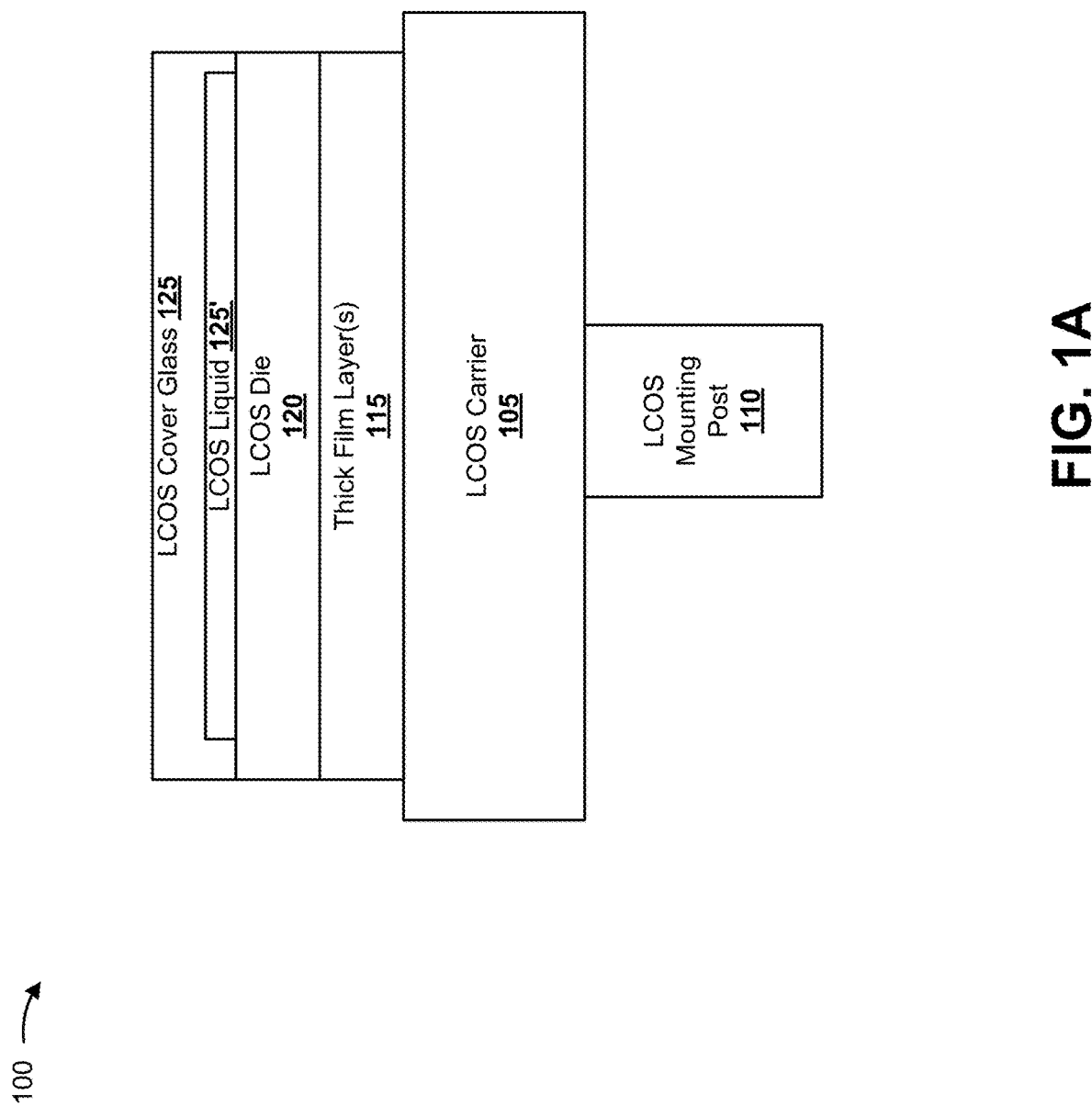
FIGS. 1A-1D are diagrams of an overview of an example implementation described herein.

The following detailed description of example implementations refers to the accompanying drawings. The same reference numbers in different drawings may identify the same or similar elements.

A liquid crystal on substrate (LCOS) assembly may be used for a switching functionality in an optical communication system, such as in a wavelength selective switch. The LCOS assembly may include a switching engine surface that is associated with a set of pixels that correspond to a set of ports to direct wavelength channels in the wavelength selective switch. When the LCOS assembly becomes misaligned with another optical element of an optical communication system, such as an optical fiber array and/or the like, by a threshold amount, optical switching performance may be inhibited.

An LCOS assembly may include multiple components, such as multiple layers of material, multiple sub-assemblies, and/or the like. For example, the LCOS assembly may include an LCOS carrier, an LCOS die, an LCOS cover glass, an LCOS mounting post, and/or the like. The LCOS cover glass may include a cavity in which LCOS liquid may be disposed. The LCOS cover glass may be mounted to the LCOS die to enclose the LCOS liquid in the cavity of the LCOS cover glass.

The components of the LCOS assembly may be associated with different materials associated with different coefficients of thermal expansion. For example, a first component of an LCOS assembly may be manufactured from a first material with a first coefficient of thermal expansion and a second component of the LCOS assembly may be manufactured from a second material with a second coefficient of thermal expansion. As an example, the LCOS liquid may be associated with a first coefficient of thermal expansion that differs from a second coefficient of thermal expansion of another, solid component of the LCOS assembly by a threshold amount. Similarly, the LCOS die may be associated with a first coefficient of thermal expansion, the LCOS carrier may be associated with a second coefficient of thermal expansion, and the LCOS mounting post may be associated with a third coefficient of thermal expansion, each of which may differ by a threshold amount.

The LCOS assembly may be aligned in an optical path with other optical elements of an optical communication system at an ambient temperature (e.g., room temperature, such as approximately 23 degrees Celsius (C)). During operation of the optical communication system, an operating temperature of the LCOS assembly may increase to become greater than a threshold temperature, such as greater than approximately 50 degrees Celsius (C), approximately 55 degrees C., approximately 60 degrees C., approximately 65 degrees C., approximately 70 degrees C., and/or the like. The coefficient of thermal expansion mismatch between the multiple components of the LCOS assembly may result in a temperature-induced curvature. For example, based on a change from the ambient temperature to a threshold operating temperature, a change to a beam shift and a threshold steering angle may be caused for the LCOS assembly and/or ports thereof, thereby a threshold misalignment to a fiber array of an optical system may be induced. In this way, the temperature-induced optical alignment sensitivity of the LCOS assembly may inhibit use of the LCOS assembly as a switching engine in an optical system, such as an optical communication system, a wavelength selective switch, and/or the like.

In some cases, a temperature control device, such as a thermoelectric cooler may be deployed to control the operating temperature of the LCOS assembly. However, the thermoelectric cooler and/or control devices associated therewith may result in excessive cost and/or package size for the LCOS assembly and an optical communication system. Similarly, maintaining the LCOS assembly in a temperature controlled environment may result in excessive cost and/or excessive energy consumption. Alternatively, a heat sink material may be selected for the LCOS assembly. However, selecting materials for the LCOS assembly based on a heat sink capability may limit material selection for the LCOS assembly, thereby increasing cost, reducing durability, reducing optical performance, and/or the like relative to other potential material selections for the LCOS assembly.

Some implementations, described herein, may provide an optical switching component, such as an LCOS assembly, with a reduced optical alignment sensitivity to temperature change. For example, one or more thick layers (e.g., thick film layers) may be deposited onto a surface of a component of the LCOS assembly to control the temperature-induced change to a beam shift and steering angle. In this way, the LCOS assembly may experience temperature-induced curvature with reduced optical alignment sensitivity from being optically aligned at an alignment temperature (e.g., room temperature) to operating at an operating temperature relative to other LCOS assemblies, such as LCOS assemblies using thin film layers and/or the like.

Moreover, some implementations, described herein, may thereby reduce a likelihood of a misalignment of the LCOS assembly and another optical element of an optical system, such as an optical fiber of a wavelength selective switch. Furthermore, some implementations, described herein, may provide a thick layer for other types of optical alignment sensitive optical elements, such as a wavelength selective switch, a microelectromechanical system, an optical bench (e.g., a ceramic optical bench), and/or the like, thereby reducing a temperature-induced change to a beam shift or steering angle relative to optical elements that do not include thick films. Moreover, based on controlling a temperature-induced change to a beam shift or steering angle of the LCOS assembly using a thick layer, a cost and package size may be reduced relative to use of a thermoelectric cooler and a material selection may be improved relative to using heat sink materials for LCOS assembly manufacture, thereby improving durability, reducing cost, and improving optical performance.

FIGS. 1A-1D are diagrams of an overview of an example implementation 100 of an optical switching component described herein. As shown in FIG. 1A, example implementation 100 shows an LCOS assembly that includes an LCOS carrier 105, an LCOS mounting post 110, one or more thick layers 115 (e.g., which may be thick film layers, epoxied layers, and/or the like), and a switching engine, which may include an LCOS die 120 and an LCOS cover glass 125.

As further shown in FIG. 1A, LCOS mounting post 110 may be mounted to a bottom surface of LCOS carrier 105. In some implementations, LCOS mounting post 110 may be a glass-based mounting post, a silica-based mounting post, and/or the like. For example, LCOS mounting post 110 may be selected as a Borofloat mounting post to reduce a coefficient of thermal expansion mismatch between LCOS mounting post 110 and LCOS carrier 105. In this way, a local curvature effect resulting from a coefficient of thermal expansion mismatch may be controlled.

In some implementations, LCOS mounting post 110 may be selected as another type of material with a threshold coefficient of thermal expansion mismatch to LCOS carrier 105. For example, LCOS mounting post 110 may be associated with a first coefficient of thermal expansion that differs from a second coefficient of thermal expansion of LCOS carrier 105 by a threshold amount. In this case, the one or more thick layers 115 may be used to control the local curvature effect (e.g., relating to the coefficient of thermal expansion mismatch between LCOS mounting post 110 and LCOS carrier 105). Moreover, the one or more thick layers 115 may be used to control a global curvature effect (e.g., relating to a coefficient of thermal expansion mismatch between LCOS die 120 and LCOS carrier 105, an LCOS liquid and other components of the LCOS assembly, and/or the like), as described herein. In this way, utilization of the one or more thick layers 115 may enable a greater quantity of materials for selection for LCOS mounting post 110, thereby reducing cost, improving manufacturability, improving alignment of the LCOS assembly to other optical elements of an optical communication system, and/or the like.

As further shown in FIG. 1A, the one or more thick layers 115 may be disposed between LCOS carrier 105 and LCOS die 120. In some implementations, LCOS carrier 105 may be an aluminum nitride (AlN) layer. For example, LCOS carrier 105 may be associated with a coefficient of thermal expansion of approximately 4.6 parts per million per degree Celsius (ppm/C). In some implementations, LCOS die 120 may be a silicon (Si) layer. For example, LCOS die 120 may be associated with a coefficient of thermal expansion of approximately 2.5 ppm/C. In some implementations, LCOS cover glass 125 may be a glass layer that includes a cavity to enclose an LCOS liquid 125' (e.g., a liquid crystal with a particular coefficient of thermal expansion). For example, LCOS liquid 125' may be disposed in the cavity of LCOS cover glass 125, and LCOS cover glass 125 may be attached to LCOS die 120 to seal LCOS liquid 125' in the cavity of LCOS cover glass 125.

In some implementations, a coefficient of thermal expansion mismatch between LCOS die 120 and LCOS carrier 105 may cause a threshold amount of temperature-induced change to a beam shift or steering angle for the LCOS assembly, and as a result of an optical sensitivity to alignment optical performance may be negatively affected for an optical communication system that includes the LCOS assembly. Additionally, or alternatively, a temperature-induced liquid expansion of LCOS liquid 125' may cause a threshold amount of temperature-induced change to a beam shift or steering angle for the LCOS assembly, which may negatively affect optical performance for the optical communication system. For example, collectively, the coefficient of thermal expansion mismatch and the liquid expansion may result in a threshold curvature change (e.g., steering angle change), such as a curvature change of greater than approximately 0.5 millidegrees of curvature change per degree Celsius temperature change (m°/C.), greater than approximately 0.75 m°/C., greater than approximately 0.9 m°/C., greater than approximately 1 m°/C., and/or the like. In some implementations, the temperature-induced beam shift or steering angle may be less than a threshold enabling use of the LCOS assembly for a range of wavelengths of light being directed to and/or from the LCOS assembly, such as a range from approximately 1000 nanometers to approximately 2000 nanometers, a range of approximately 1500 nanometers to approximately 1600 nanometers, a range of approximately 1525 nanometers to approximately 1575 nanometers, and/or the like.

However, based on disposing the one or more thick layers 115 between LCOS carrier 105 and LCOS die 120, the temperature-induced change to a beam shift or steering angle relating to a temperature change from an ambient temperature at which optical elements of the optical communication system are aligned to an operating temperature of the optical communication system may be reduced to less than a threshold amount. For example, the temperature-induced change to a beam shift or steering angle may be reduced to less than approximately 1 m°/C., less than approximately 0.9 m°/C., less than approximately 0.75 m°/C., less than approximately 0.5 m°/C., and/or the like. In this way, utilization of the one or more thick layers 115 reduces a temperature-induced change to a beam shift or steering angle of an LCOS assembly, thereby improving durability, optical performance, and/or the like of the LCOS assembly relative to other techniques for manufacturing an LCOS assembly. Moreover, based on control temperature-induced change to a beam shift or steering angle without controlling temperature, such as by using a thermoelectric cooler or a heat sink material, the one or more thick layers 115 enable a reduced package size, a reduced cost, and an increased quantity of materials for selection for the LCOS assembly.

Figure 1B:
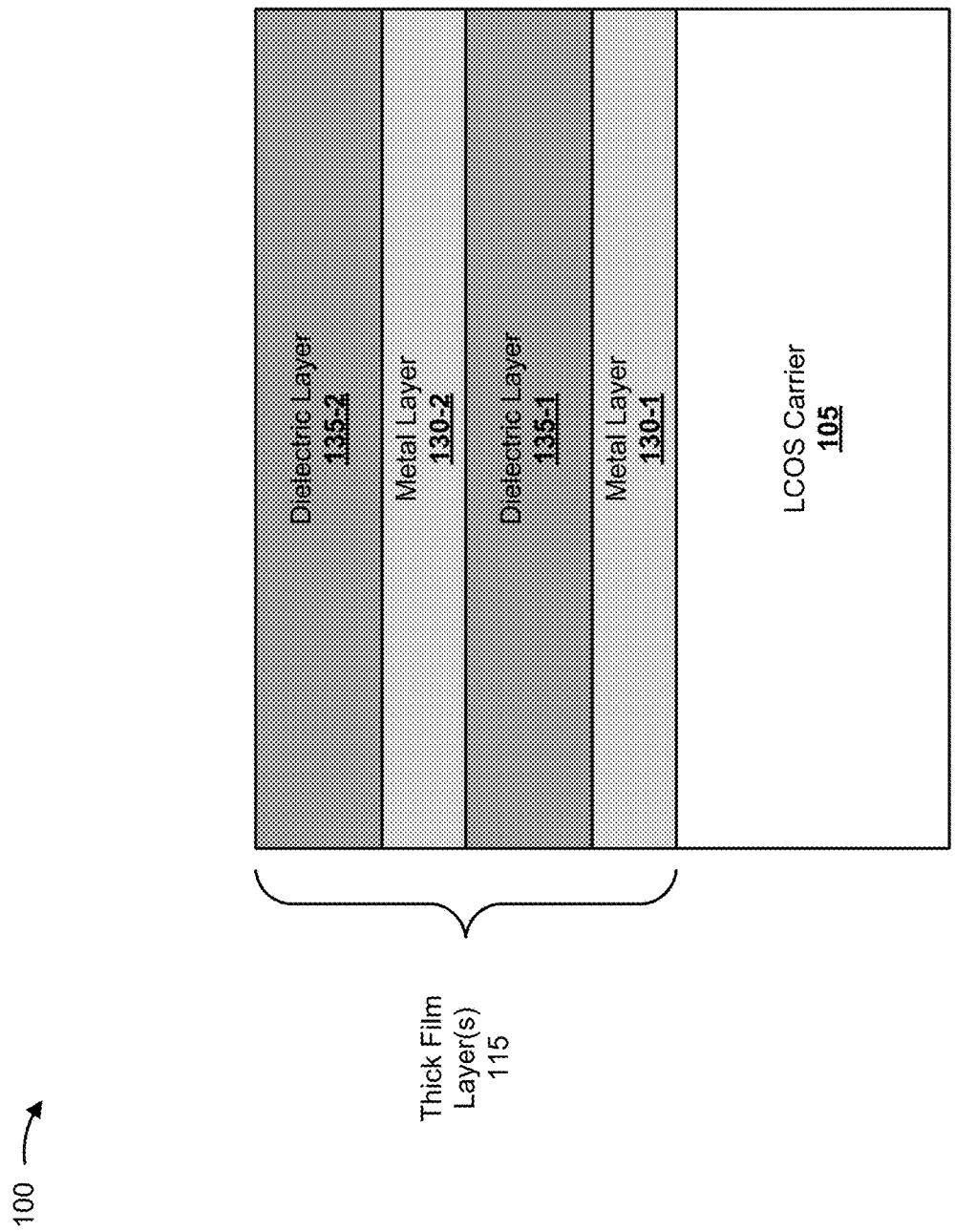

As shown in FIG. 1B, the one or more thick layers 115 disposed on a surface of LCOS carrier 105 may include multiple layers. For example, thick layer 115 may include a set of metal layers 130 (shown as metal layer 130-1 and metal layer 130-2) and a set of dielectric layers 135 (shown as dielectric layer 135-1 and dielectric layer 135-2), in an alternating arrangement. In this case, metal layers 130 may provide electrical traces for the LCOS assembly to enable electrical signaling for the LCOS assembly. For example, metal layers 130 may be electrically conductive layers to enable electrical signaling, such as gold layers, copper layers, and/or the like. In some implementations, dielectric layers 135 may be electrically insulating layers to enable the electrical signaling via metal layers 130. For example, dielectric layers 135 may be QM44 dielectric layers or another electrically insulating material.

In some implementations, the one or more thick layers 115 may be associated with a threshold thickness to reduce a temperature-induced change to a beam shift or steering angle. For example, for an LCOS carrier 105 of thickness of approximately 1000 micrometers, thick layers 115 may be associated with a total thickness of greater than approximately 20 micrometers, greater than approximately 50 micrometers, greater than approximately 70 micrometers, greater than approximately 100 micrometers, greater than approximately 200 micrometers, greater than approximately 500 micrometers, greater than approximately 1000 micrometers, greater than approximately 2000 micrometers, and/or the like. In this case, for a thick layers 115 thickness of approximately 70 micrometers, metal layers 130-1 and 130-2 may be associated with thicknesses of approximately 10 micrometers and dielectric layers 135-1 and 135-2 may be associated with thicknesses of approximately 25 micrometers.

Additionally, or alternatively, metal layers 130 may be each be associated with a thickness of greater than approximately 5 micrometers, greater than approximately 10 micrometers, greater than approximately 20 micrometers, greater than approximately 50 micrometers, greater than approximately 100 micrometers, greater than approximately 200 micrometers, greater than approximately 500 micrometers, and/or the like. Additionally, or alternatively, dielectric layers 135 may each be associated with a thickness of greater than approximately 5 micrometers, greater than approximately 10 micrometers, greater than approximately 20 micrometers, greater than approximately 50 micrometers, greater than approximately 100 micrometers, greater than approximately 200 micrometers, greater than approximately 500 micrometers, and/or the like.

In some implementations, each metal layer 130 may be associated with a common thickness, such as a thickness of approximately 10 micrometers. Additionally, or alternatively, each metal layer 130 may be associated with a different thickness, such as metal layer 130-1 being associated with a thickness of less than approximately 10 micrometers and metal layer 130-2 being associated with a thickness of greater than approximately 10 micrometers. Similarly, dielectric layers 135 may be associated with a common thickness, different thicknesses, and/or the like. In some implementations, other quantities or arrangements of layers may be possible for the one or more thick layers 115, such as fewer layers, additional layers, or different layers. Based on using thick layers for, for example, metal layers 130, electrical performance of the LCOS assembly is improved relative to using thin film layers for electrical traces. In this way, using the one or more thick layers 115 to control the temperature-induced change to a beam shift or steering angle of the LCOS assembly also improves electrical performance of the LCOS assembly. Additionally, or alternatively, one or more layers of the one or more thick layers 115 may be used for another functionality, such as an electrical functionality (e.g., another signaling functionality, an insulating functionality, etc.), a mechanical functionality (e.g., deformation reduction, strain reduction, durability improvement, a protective layer, a heat dissipation layer, etc.), an optical functionality, and/or the like.

In some implementations, the one or more thick layers 115 may be deposited onto LCOS carrier 105 as thick films. For example, a thick film deposition technique may be used to deposit the one or more thick layers 115. In some implementations, thick layers 115 may be layers of material epoxied onto LCOS carrier 105, which may complete cover LCOS 105, partially cover LCOS 105 (e.g., to cause a local compensation effect), and/or the like. In some implementations, multiple deposition steps may be used to deposit the one or more thick layers 115. For example, a first deposition step may be used to deposit a first metal layer 130, a second deposition step may be used to deposit a first dielectric layer 135, a third deposition step may be used to deposit a second metal layer 130, and/or the like. In some implementations, the one or more thick layers 115 may cover a portion of LCOS carrier 105. For example, the one or more thick layers 115 may cover less than an entire top surface of LCOS carrier 105, the entire top surface of LCOS carrier 105, and/or the like. In some implementations, a patterning procedure may be applied to at least one of the one or more thick layers 115. For example, to provide electrical signaling for the LCOS assembly, first metal layer 130 may be patterned using a patterning technique to form one or more electrical traces.

Although some implementations, described herein, are described in terms of an LCOS assembly, a thick layer may be used to control temperature-induced change to a beam shift or steering angle for another optical switching component, such as a microelectromechanical device; another optical element, such as a reflective optical surface (e.g., a mirror), a transmissive optic (e.g., a lens); and/or the like to reduce temperature-induced change to a beam shift or steering angle, and thereby improve performance of the other optical elements.

Figure 1C:
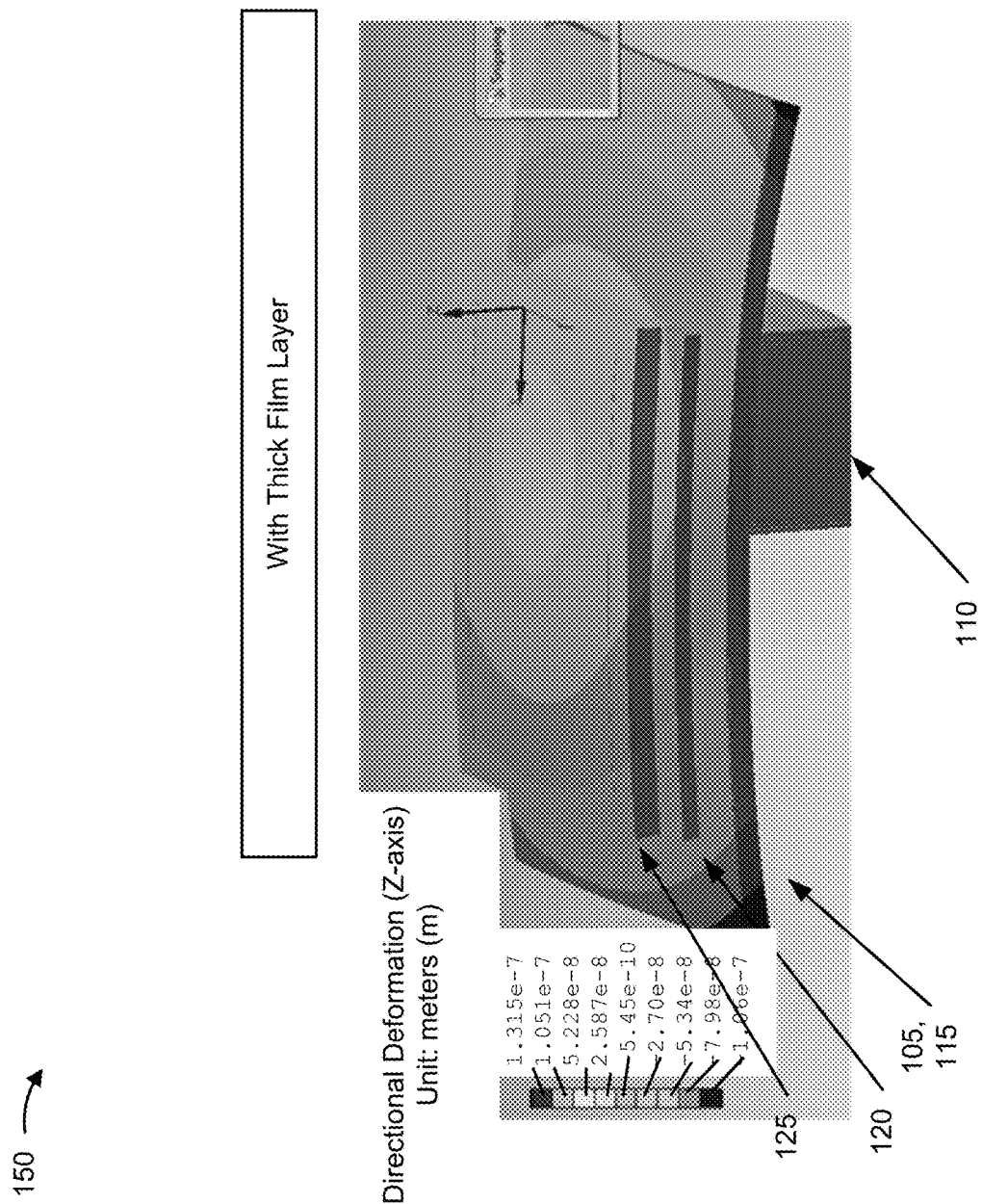
Figure 1D:
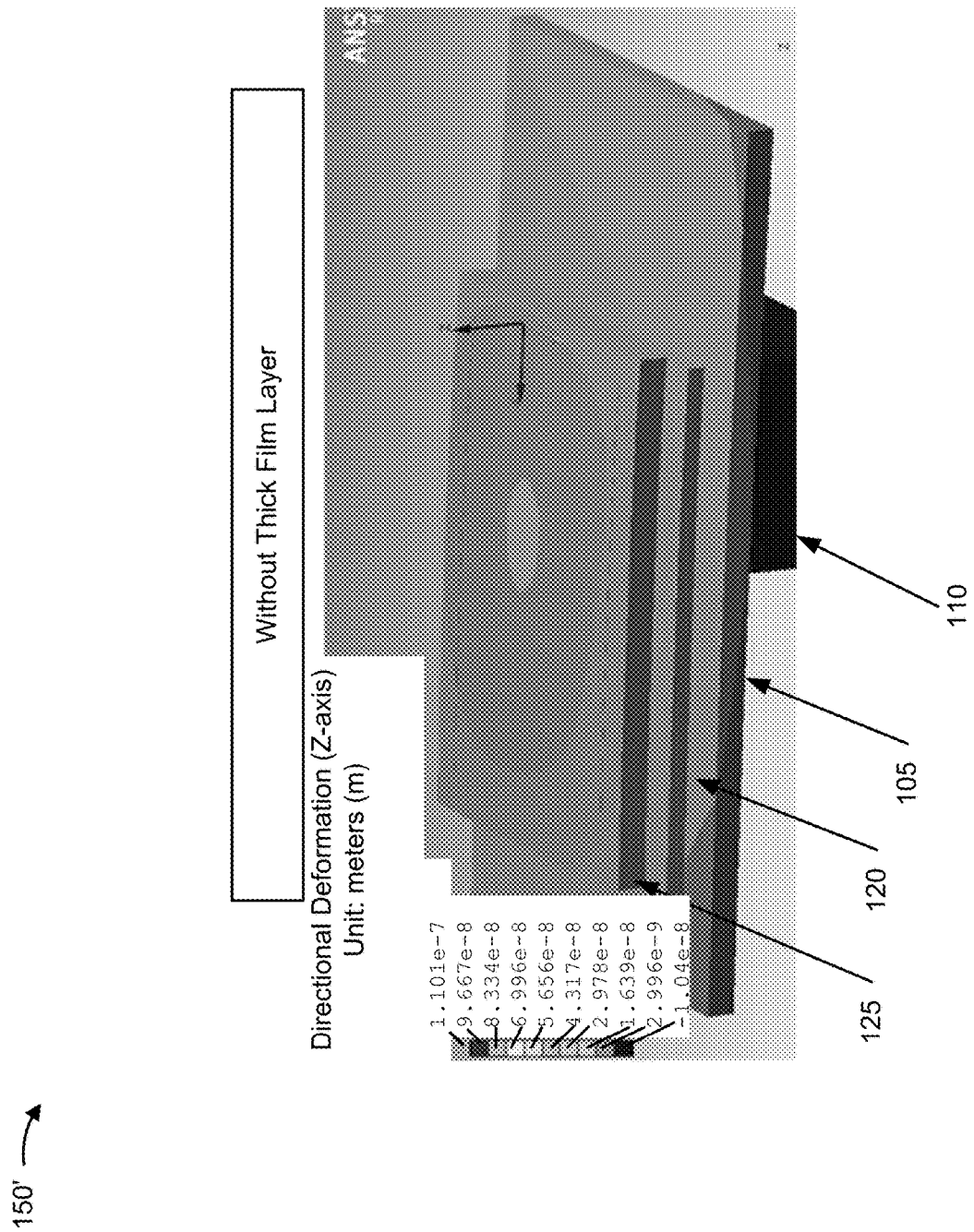

FIGS. 1C and 1D, respectively, show an example of physical deformation of an LCOS assembly 150 with the one or more thick layers 115 relative to another LCOS assembly 150' without a thick layer. The physical deformation is calculated based on a 1 degree Celsius change in temperature from an alignment temperature (e.g., 22 degrees Celsius). A total physical deformation during operation may be from the alignment temperature (e.g., a calibration temperature) to an operating temperature (e.g., 60 degrees Celsius).

As further shown in FIGS. 1C and 1D, the LCOS assembly 150 with the one or more thick layers 115 (e.g., a 70 micrometer set of thick layers) experiences a greater total physical deformation than the LCOS assembly 150' without a thick layer, but reduces a total angular deflection of light than LCOS assembly 150'. For example, a maximum total physical deformation is increased from $1.101*10^{-7}$ for LCOS assembly 150' to $1.315*10^{-7}$ for LCOS assembly 150.

Based on thermal sensitivity being related to refractive indices of an LCOS assembly of, for example, −1.45 for LCOS cover glass 125 and 3.45 for a silicon die of LCOS carrier 105, adding the thick layers 115 results in a reduced effective thermal sensitivity between LCOS cover glass 125 and the silicon die (e.g., a reduced change to an angle shift or steering angle of light), despite the greater physical deformation of the LCOS assembly. In this case, a temperature-induced range of sensitivities to temperature change (e.g., a thermal sensitivity) is reduced at an operating temperature (e.g., 60 degrees Celsius) despite the greater total physical deformation, thereby improving optical performance of the LCOS assembly 150 with the one or more thick layers 115 relative to the LCOS assembly 150' without a thick layer. In some implementations, deformation of LCOS assembly 150/150' may be an angular deformation, a polynomial deformation, and/or the like.

As indicated above, FIGS. 1A-1D are provided merely as examples. Other examples are possible and may differ from what was described with regard to FIGS. 1A-1D.

Figure 2A:
FIGS. 2A-2C are diagrams of characteristics relating to an example implementation described herein.
Figure 2B:
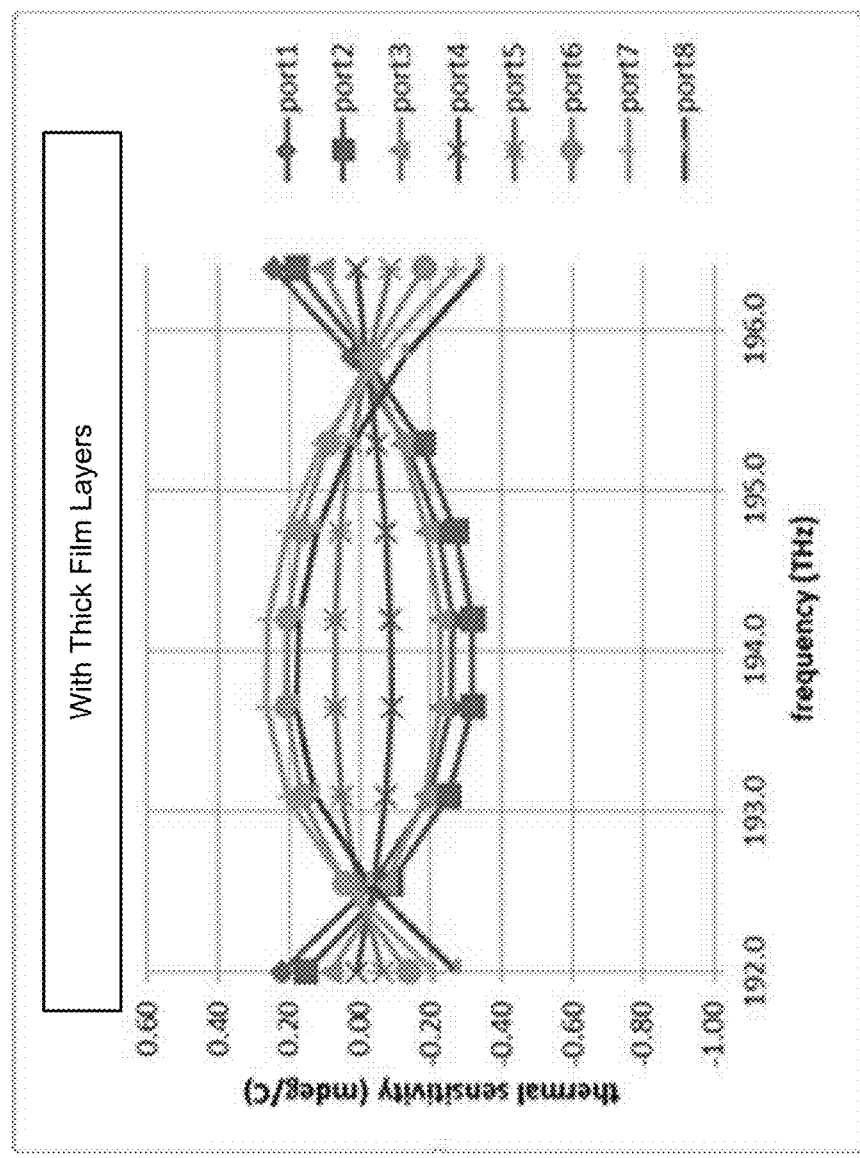
Figure 2C:
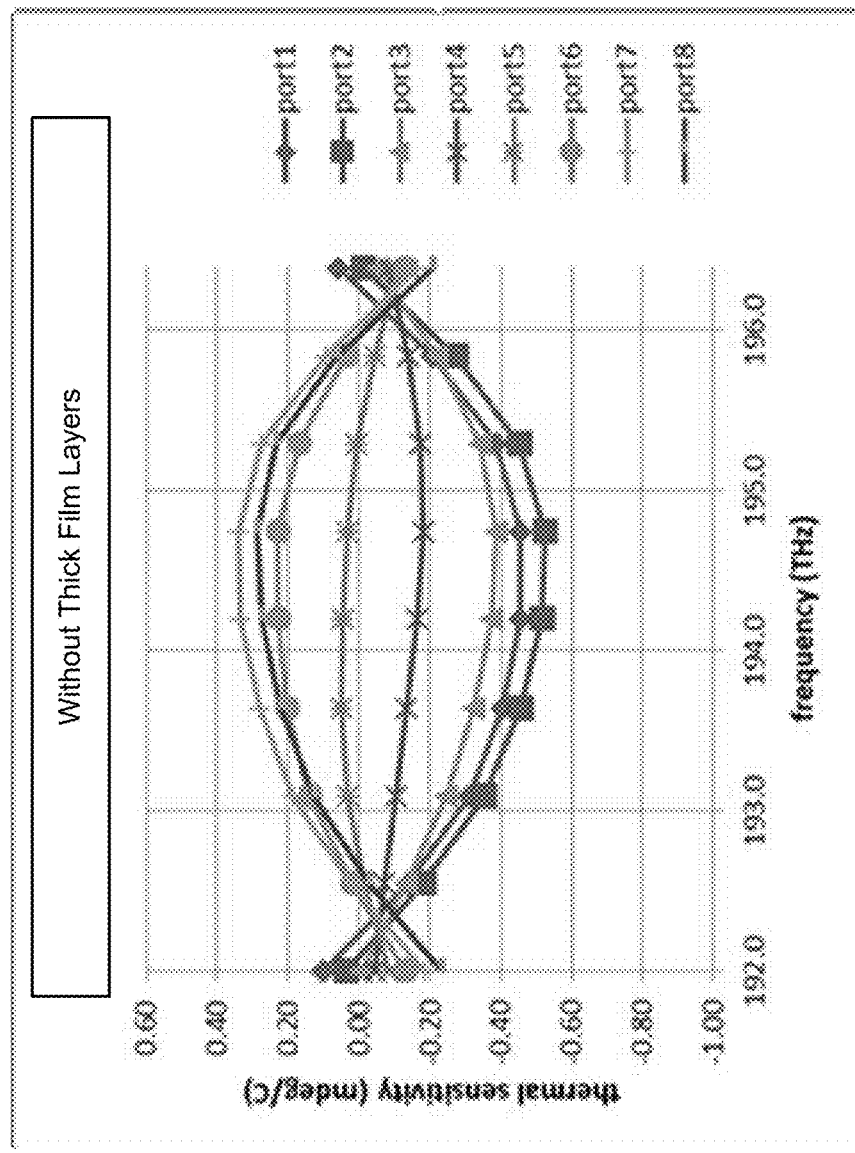

FIGS. 2A-2C are diagrams relating to thermal sensitivity of example implementations described herein.

As shown in FIG. 2A, and by diagram 200, a body 210 may include a first layer 220 and a second layer 230. For example, an optical switching component, such as an LCOS assembly, may include a substrate and a thick film layer disposed on the substrate. In this case, first layer 220 may correspond to LCOS carrier 105 and second layer 230 may correspond to the one or more thick layers 115. First layer 220 may be associated with a first height, $h_1$, a first Young's modulus $E_1$, and a first coefficient of thermal expansion $\alpha_1$. Similarly, second layer 230 may be associated with a second height, $h_2$, a second Young's modulus $E_2$, and a second coefficient of thermal expansion $\alpha_2$. Body 210 may be associated with a net height, h. In some implementations, a temperature-induced curvature of body 210 may be determined based on an equation:

$$\text{Bent curvature} = \frac{(\alpha_2 - \alpha_1)\Delta T}{\frac{h}{2} + \frac{2(E_1 I_1 + E_2 I_2)}{hw}\left(\frac{1}{h_1 E_1} + \frac{1}{h_2 E_2}\right)} \qquad (1)$$

where I represents an area moment of inertia for a cross-section of body 210, w represents a width of body 210, and ΔT represents a change in temperature of body 210. Thus, altering parameters such as a Young's modulus for layer 230 (e.g., the one or more thick layers 115 by altering a material selection), a coefficient of thermal expansion of layer 230, and a height of layer 230 result in a change to a bent curvature of body 210, as shown in FIGS. 2B, 3A, 3B, and 3C.

As shown in FIGS. 2B and 2C, respectively, diagrams 250 and 250' of a temperature-induced change to a beam shift or steering angle of an LCOS assembly with a thick film layer (e.g., the one or more thick layers 115) and without a thick film layer.

As further shown in FIGS. 2B and 2C, for an LCOS assembly with a set of ports 1-8, a thermal sensitivity is determined as a function of optical frequency. For example, for an optical frequency of 194.0 terahertz (THz) (a center channel wavelength of 1545 nanometers), the LCOS assembly without a thick film layer experiences a range of temperature-induced changes to a beam shift or steering angle for ports of the LCOS assembly of approximately −0.6 m°/C. to approximately 0.4 m°/C. In contrast, the LCOS assembly with the thick film layer (e.g., an approximately 70 micrometer thick film layer on an approximately 1000 micrometers substrate) experiences a range of temperature-induced change to a beam shift or steering angle for ports of the LCOS assembly of approximately −0.3 m°/C. to approximately 0.2 m°/C. In this case, adding the thick film layer to the LCOS assembly results in a reduction from an approximately 1.0 m°/C. range of temperature-induced changes to a beam shift or steering angle (e.g., also termed a thermal sensitivity of 1.0 m°/C.) to an approximately 0.5 m°/C. range of temperature-induced changes to a beam shift or steering angle (e.g., also termed a thermal sensitivity of 0.5 m°/C.).

As indicated above, FIGS. 2A-2C are provided merely as examples. Other examples are possible and may differ from what was described with regard to FIGS. 2A-2C.

Figure 3A:
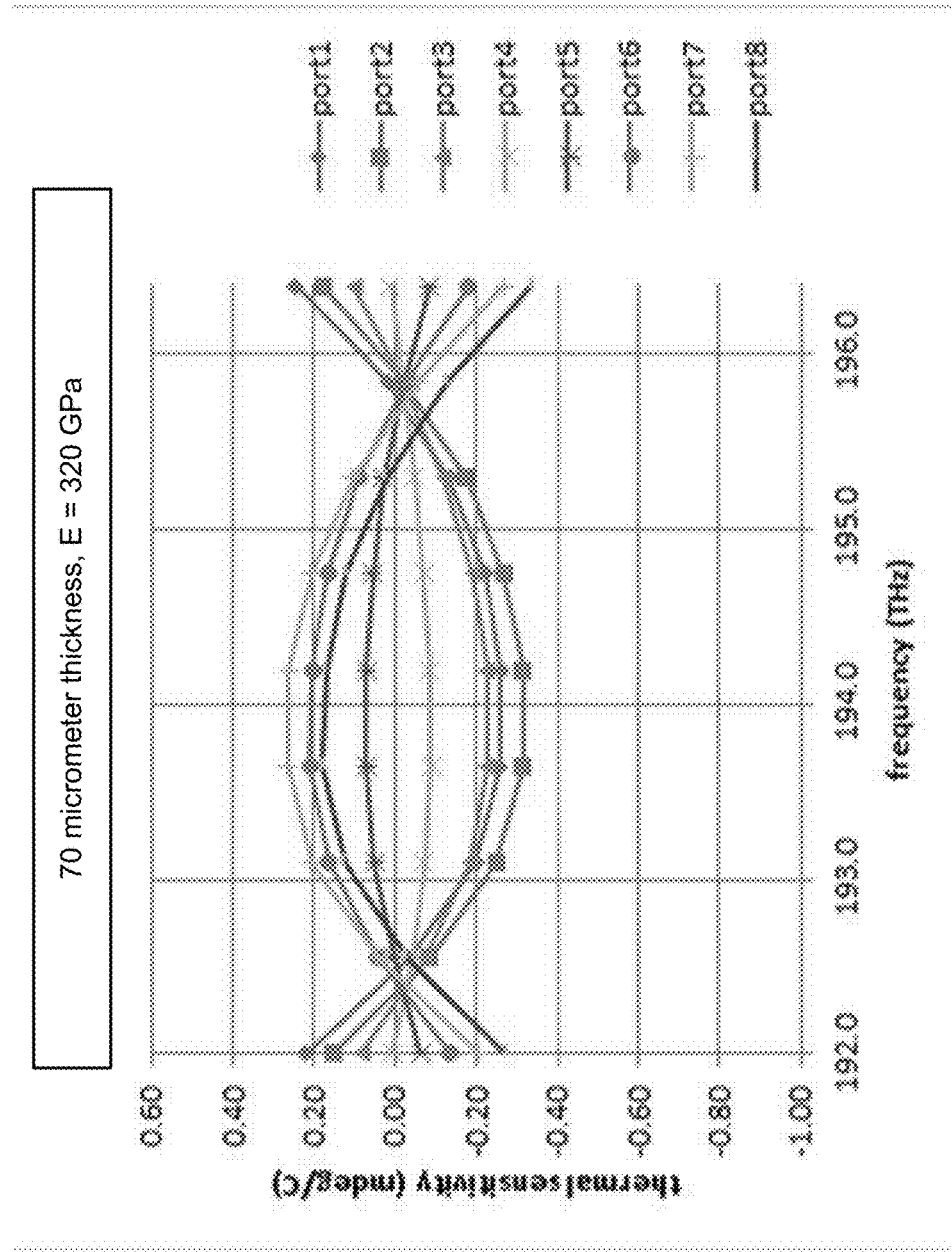
FIGS. 3A-3C are diagrams of characteristics relating to an example implementation described herein.
Figure 3B:
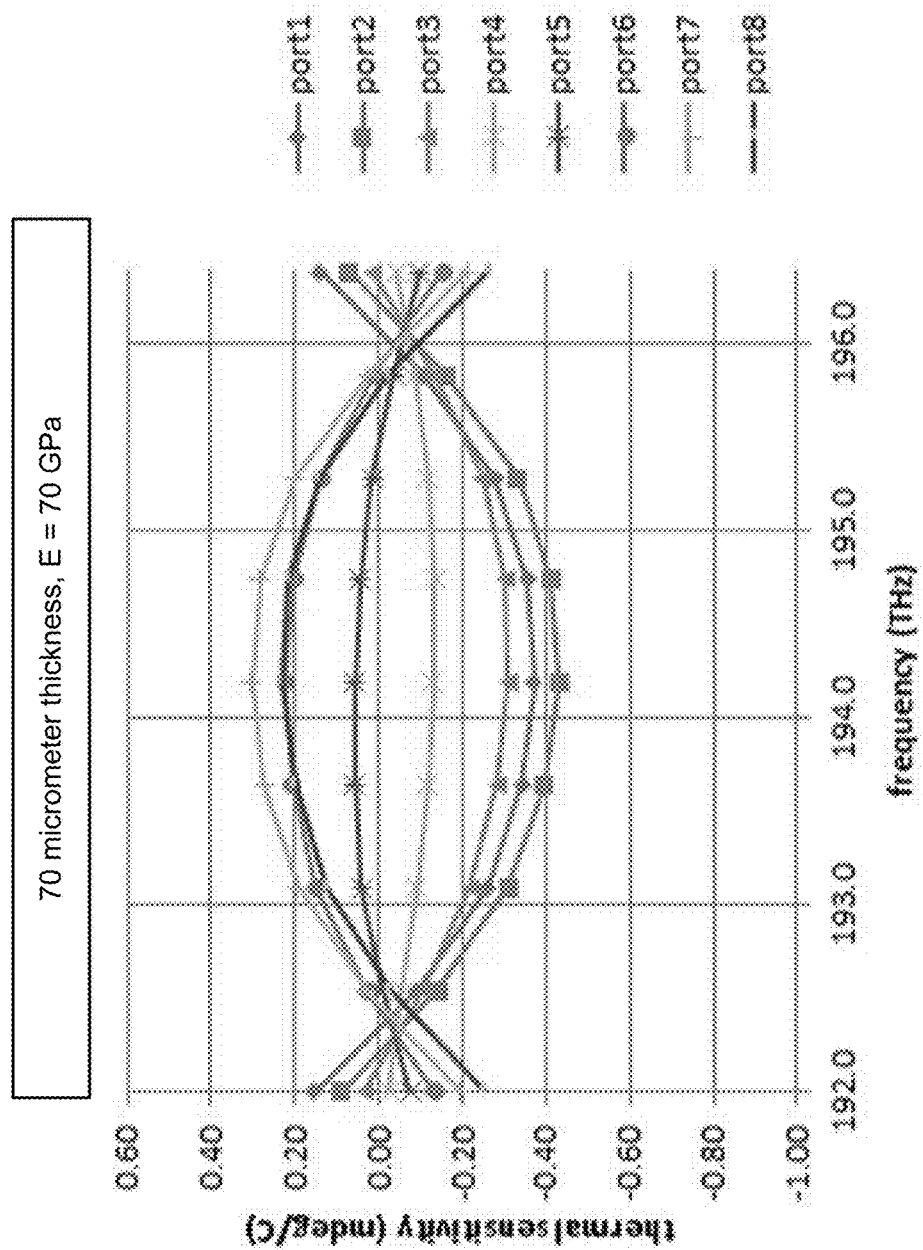
Figure 3C:
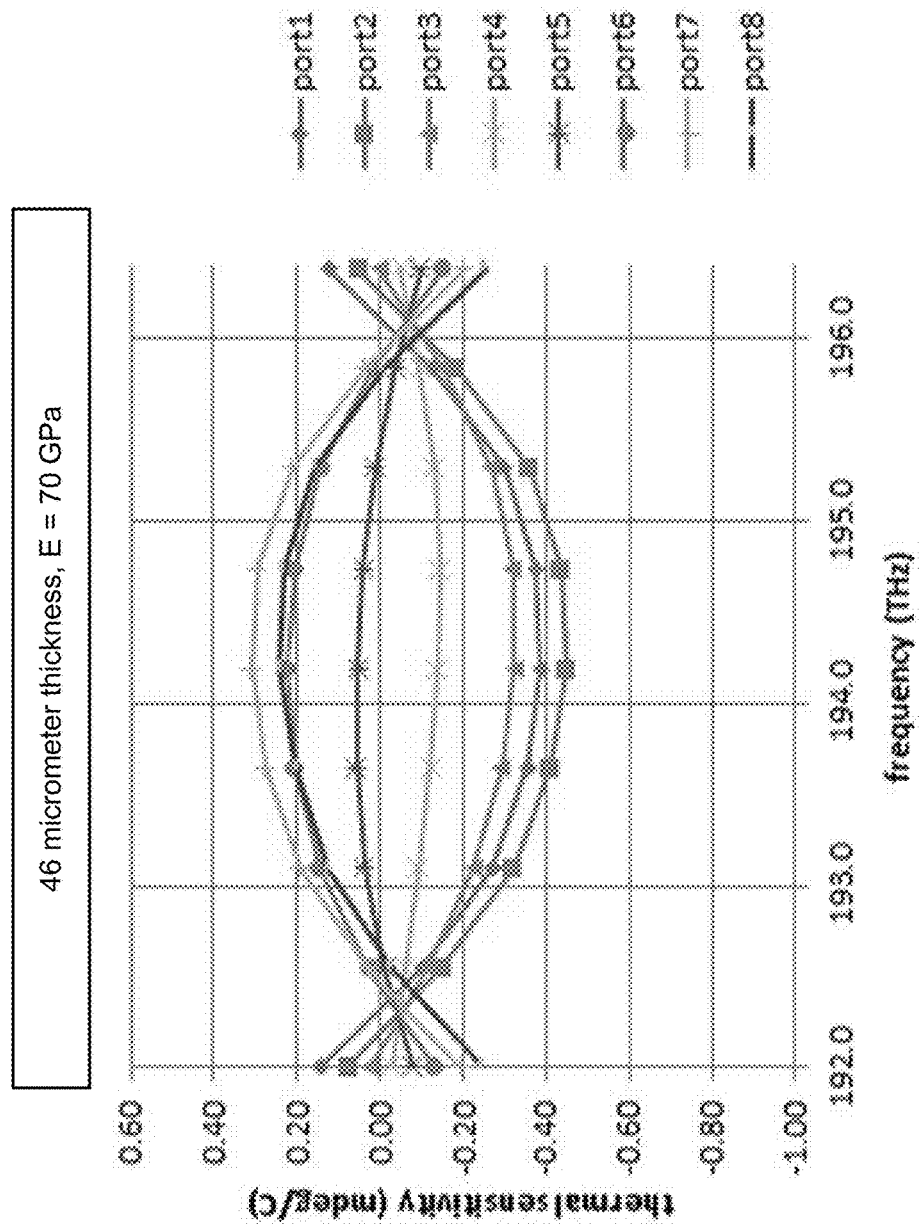

FIGS. 3A-3C are diagrams 300, 320, and 340 of temperature-induced changes to a beam shift or steering angle of example implementations described herein. As shown in FIG. 3A, and by diagram 300, a temperature-induced change to a beam shift or steering angle (e.g., a thermal sensitivity) is determined for an LCOS assembly with a 70 micrometer thick film layer and a 320 gigapascal (GPa) Young's modulus for dielectric layers of the thick film layer. As shown in FIG. 3B, and by diagram 320, a temperature-induced change to a beam shift or steering angle (e.g., a thermal sensitivity) is determined for an LCOS assembly with a 70 micrometer thin film layer and a 70 GPa Young's modulus for dielectric layers of the thick film layer. As shown in FIG. 3C, and by diagram 340, a temperature-induced beam shift or steering angle (e.g., a thermal sensitivity) is determined for an LCOS assembly with a 46 micrometer thin film layer and a 70 GPa Young's modulus for dielectric layers of the thick film layer.

As further shown in FIGS. 3A and 3B, for LCOS assemblies with a set of ports 1-8, a thermal sensitivity is determined as a function of optical frequency. For example, for an optical frequency of 194.0 terahertz (THz) (a center channel wavelength of 1545 nanometers), the LCOS assembly with the 320 GPa Young's modulus dielectric layer experiences a range of temperature-induced changes to a beam shift or steering angle for ports of the LCOS assembly of −0.3 m°/C. to 0.2 m°/C. (e.g., also termed a thermal sensitivity of between −0.3 m°/C. to 0.2 m°/C.). In contrast, the LCOS assembly with the 70 GPa Young's modulus dielectric layer experiences a range of temperature-induced change to a beam shift or steering angle for ports of the LCOS assembly of −0.4 m°/C. to 0.3 m°/C. (e.g., also termed a thermal sensitivity of between −0.4 m°/C. to 0.3 m°/C.). In this case, an increase in Young's modulus results in a reduction in a size of the range of temperature-induced changes to a beam shift or steering angle. Moreover, multiple materials with multiple different Young's moduli may be selected to achieve a reduction of a size of the range of temperature-induced change to a beam shift or steering angle relative to the LCOS assembly without the thick film layer (shown in FIG. 2B, and by diagram 250).

As further shown in FIG. 3C, the LCOS assembly with the 45 micrometer thin film layer experiences a range of temperature-induced change to a beam shift or steering angle for ports of the LCOS assembly of −0.4 m°/C. to 0.3 m°/C. (e.g., also termed a thermal sensitivity of between −0.4 m°/C. to 0.3 m°/C.). In this case, an increase in thickness to 70 micrometers, as shown in diagram 320, results in a reduced range of temperature-induced changes to a beam shift or steering angle. Moreover, multiple materials with multiple thicknesses may be selected as the thick film layer to achieve a reduced range of temperature-induced changes to a beam shift or steering angle relative to the LCOS assembly without the thick film layer (shown in FIG. 2B, and by diagram 250).

As indicated above, FIGS. 3A-3C are provided merely as examples. Other examples are possible and may differ from what was described with regard to FIGS. 3A-3C.

In this way, including at least one thick film layer in an optical switching component, such as an LCOS assembly, a microelectromechanical system, a wavelength selective switch, and/or the like, reduces a temperature-induced change to a beam shift or steering angle (e.g., a thermal sensitivity), thereby improving alignment of the optical switching component at an operating temperature, improving durability, improving manufacturability, and reducing cost relative to other techniques for manufacturing an optical switching component. Moreover, based on including one or more electrically conductive layers in the at least one thick film layer, the at least one thick film layer enables electrical signaling for the optical switching component without including other signaling paths in the optical switching component.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A liquid crystal on substrate (LCOS) assembly, comprising:
   an LCOS carrier;
   at least one thick layer on the LCOS carrier and associated with a threshold thickness,
      wherein the threshold thickness is at least 5 micrometers; and
   a switching engine on the at least one thick layer,
      wherein the switching engine includes an LCOS die and an LCOS cover glass to enclose an LCOS liquid, and wherein the LCOS assembly is associated with a thermal sensitivity of less than 0.5 millidegrees of curvature per degree Celsius for a particular temperature range,
wherein the particular temperature range is an ambient temperature to at least 50 degrees Celsius.

2. The LCOS assembly of claim 1, wherein the at least one thick layer includes a plurality of thick layers;
wherein the plurality of thick layers includes a set of metal layers to conduct an electrical signal for the LCOS assembly; and
wherein the plurality of thick layers includes a set of dielectric layers.

3. The LCOS assembly of claim 1, wherein the at least one thick layer includes a plurality of thick layers; and
wherein each thick layer is associated with a thickness of at least 5 micrometers.

4. The LCOS assembly of claim 1, further comprising:
an LCOS mounting post to maintain the LCOS assembly in an optical path of an optical communication system.

5. The LCOS assembly of claim 1, wherein the LCOS assembly is deformed at the ambient temperature, of the particular temperature range, to align to an optical communication system.

6. The LCOS assembly of claim 1, wherein the LCOS carrier is a substrate with a thickness of at least 1000 micrometers.

7. The LCOS assembly of claim 1, wherein a first component of the LCOS assembly is associated with a first coefficient of thermal expansion and a second component of the LCOS assembly is associated with a second coefficient of thermal expansion; and
wherein a mismatch between the first coefficient of thermal expansion and the second coefficient of thermal expansion is greater than 2 parts per million per degree Celsius.

8. The LCOS assembly of claim 1, wherein the LCOS carrier is an aluminum nitride carrier, and the LCOS die is a silicon die.

9. The LCOS assembly of claim 1, wherein the at least one thick layer includes a layer of at least one of:
gold,
copper, or
dielectric.

10. An optical switching component, comprising:
a substrate associated with a first coefficient of thermal expansion;
an optical switching engine associated with a second coefficient of thermal expansion that differs from the first coefficient of thermal expansion by a threshold amount; and
at least one thick layer disposed between the substrate and the optical switching engine to reduce a thermal sensitivity of the optical switching component to less than 1 millidegree of curvature per degree Celsius for a particular temperature range,
wherein the particular temperature range is an ambient temperature to at least 50 degrees Celsius.

11. The optical switching component of claim 10, wherein the substrate and the optical switching engine are a liquid crystal on silicon (LCOS) assembly.

12. The optical switching component of claim 10, wherein the at least one thick layer includes a first metal layer on the substrate, a first dielectric layer on the first metal layer, a second metal layer on the first dielectric layer, and a second dielectric layer on the second metal layer.

13. The optical switching component of claim 10, wherein the at least one thick layer covers less than an entire surface of the substrate.

14. The optical switching component of claim 10, wherein the at least one thick layer is associated with a thickness of greater than 50 micrometers.

15. An optical system comprising:
a switching component to perform optical switching for the optical system,
the switching component comprising:
a substrate associated with a first coefficient of thermal expansion;
a switching engine associated with a second coefficient of thermal expansion that differs from the first coefficient of thermal expansion by a threshold amount; and
at least one thick layer disposed between the substrate and the switching engine to reduce a coefficient of thermal expansion mismatch based thermal sensitivity of the switching component to less than 1 millidegree per degree Celsius of curvature for a particular temperature range from an ambient temperature to at least 50 degrees Celsius,
wherein the thick layer deforms the switching component by a threshold deformation at the ambient temperature, and
wherein the switching component maintains alignment in an optical path of the optical system for the particular temperature range.

16. The optical system of claim 15, wherein the switching component is included in a wavelength selective switch.

17. The optical system of claim 15, wherein the coefficient of thermal expansion mismatch between components of the switching component is greater than a threshold.

18. The optical system of claim 15, wherein the thermal sensitivity is a temperature-induced change to a beam shift or steering angle of less than 1 millidegree of curvature for ports of the switching component associated with light with a center wavelength of between 1500 nanometers and 1600 nanometers.

19. The optical system of claim 15, wherein the thermal sensitivity is a global curvature effect relating to a first coefficient of thermal expansion mismatch between components of the switching engine or a local curvature effect relating to a second coefficient of thermal expansion mismatch between the substrate and a mounting post.

20. The LCOS assembly of claim 1, wherein the ambient temperature is 23 degrees Celsius.

* * * * *